United States Patent [19]
Celi

[11] Patent Number: 6,038,852
[45] Date of Patent: Mar. 21, 2000

[54] WEAR RESISTANT AUGMENTOR FUEL MANIFOLD CLAMP

[75] Inventor: George R. Celi, West Palm Beach, Fla.

[73] Assignee: United Technologies Corporation, Hartford, Conn.

[21] Appl. No.: 08/986,038

[22] Filed: Dec. 5, 1997

[51] Int. Cl.$^7$ ..................................................... F02K 3/10
[52] U.S. Cl. ............................. 60/261; 60/739; 248/68.1
[58] Field of Search ................... 60/261, 739; 248/68.1, 248/69; 285/124.2

[56] References Cited

U.S. PATENT DOCUMENTS

| | | | |
|---|---|---|---|
| 2,355,742 | 8/1944 | Morehouse | 248/68.1 |
| 3,151,453 | 10/1964 | Lefebvre et al. | 60/739 |
| 5,172,877 | 12/1992 | Hattori et al. | 248/68.1 |
| 5,271,588 | 12/1993 | Doyle | 248/68.1 |

Primary Examiner—Louis J. Casaregola
Attorney, Agent, or Firm—Richard D. Getz

[57] ABSTRACT

A gas turbine augmentor fuel manifold unit is provided which includes a plurality of fuel manifolds, each having a plurality of feed tubes, and at least one wear resistant clamp for clamping the feed tubes. The wear resistant clamp includes first and second wear sleeves, first and second clamp members, and a fastener. The wear sleeves are disposed between the clamp members and the tubes to minimize wear therebetween. The first wear sleeve, which is fixed to one of the feed tubes, includes a plurality of retaining tabs to limit the travel of the first and second clamp members.

6 Claims, 3 Drawing Sheets

WEAR RESISTANT AUGMENTOR FUEL MANIFOLD CLAMP

The invention was made under a U.S. Government contract and the Government has rights herein.

BACKGROUND OF THE INVENTION

1. Technical Field

This invention relates to gas turbine augmentor fuel manifolds in general, and to gas turbine augmentor fuel manifolds retaining devices in particular.

2. Background Information

Performance aircraft often employ an augmentor immediately downstream of the turbine to produce additional trust. The augmentor typically includes an annular or bar type fuel manifold unit, a bluff body assembly, and a plurality of ignitors. An annular fuel manifold unit, for example, typically includes a plurality of hollow annular manifolds, each having at least one feed tube. During augmentation, an augmentor fuel control supplies fuel to the manifolds through the feed tube(s). When augmentor demand stops, fuel within the manifolds either returns to the augmentor fuel control through the feed tubes, or exits through ports located in the feed tubes. The bluff body assembly, positioned immediately downstream of fuel manifolds, creates quiescent pockets within the core gas path where fuel can be ignited and combustion maintained. The ignitors ignite the fuel mixture within the quiescent pockets.

The core gas path provides a harsh environment for the fuel manifolds. The manifolds are exposed to large, rapid thermal changes that cause thermal expansion and contraction. In addition to the mechanical stresses caused by thermal expansion and contraction, the manifolds are also subject to considerable mechanical loads caused by the core gas acting on the manifolds. Vibrations in the fuel manifolds and/or feed tubes caused by periodic or random mechanical forcing functions can lead to cyclic fatigue.

Hence, what is needed is an augmentor fuel apparatus that tolerates a harsh thermal environment, one that tolerates uniform and non-uniform thermal expansion and contraction, and one that avoids vibration induced fatigue.

DISCLOSURE OF THE INVENTION

It is, therefore, an object of the present invention to provide a gas turbine augmentor fuel manifold unit with an increased resistance to mechanical wear and fatigue.

It is another object of the present invention to provide a gas turbine augmentor fuel manifold unit that tolerates uniform and non-uniform thermal expansion and contraction.

According to the present invention, a gas turbine augmentor fuel manifold unit is provided which includes a plurality of fuel manifolds, each having a plurality of feed tubes, and at least one wear resistant clamp for clamping the feed tubes. The wear resistant clamp includes first and second wear sleeves, first and second clamp members, and a fastener. The wear sleeves are disposed between the clamp members and the tubes to minimize wear therebetween. The first wear sleeve, which is fixed to one of the feed tubes, includes a plurality of retaining tabs to limit the travel of the first and second clamp members.

An advantage of the present invention is that the wear resistant tube clamp maintains the augmentor fuel manifold unit feed tubes in place with minimal wear and fatigue. Specifically, the wear sleeves, disposed between the clamp members and the tubes, act as bearings between the clamp members and the feed tubes to minimize wear.

Another advantage of the present invention is that the wear resistant tube clamp permits uniform and nonuniform thermal expansion and contraction. The retaining tabs of the wear sleeve fixed to one of the feed tubes maintain the location of the clamp, and the floating nature of the other wear sleeves allows the clamped feed tubes to move relative to the feed tube with the fixed wear sleeve.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
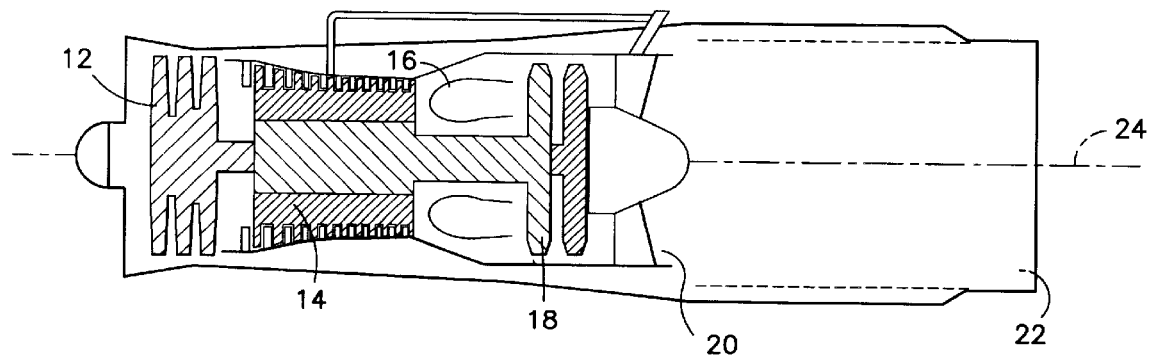
FIG. 1 is a diagrammatic view of an augmented gas turbine engine.
Figure 2:
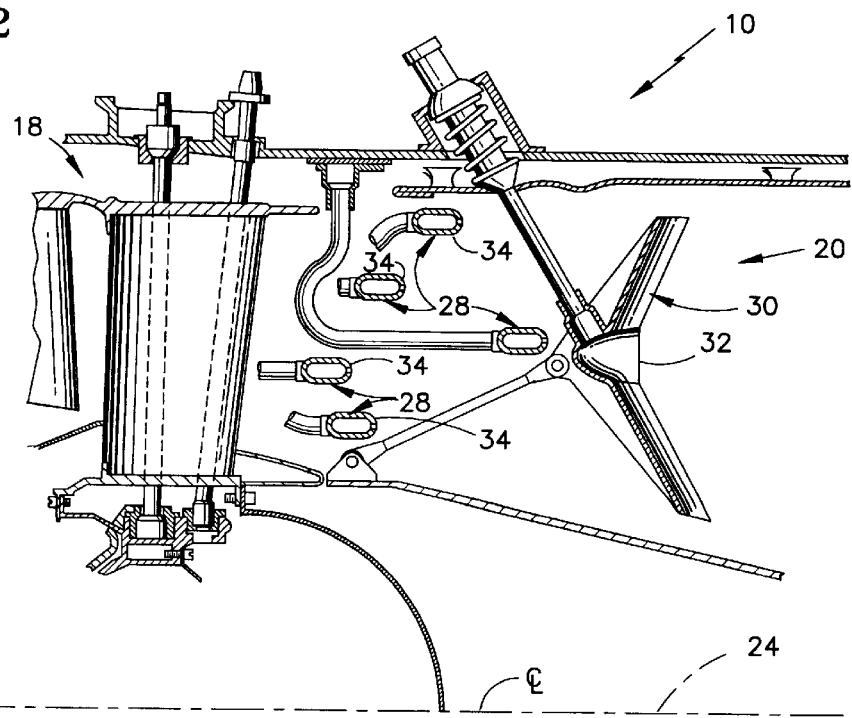
FIG. 2 is a diagrammatic partial view of a gas turbine engine having a plurality of annular augmentor fuel manifolds disposed aft of a turbine.
Figure 3:
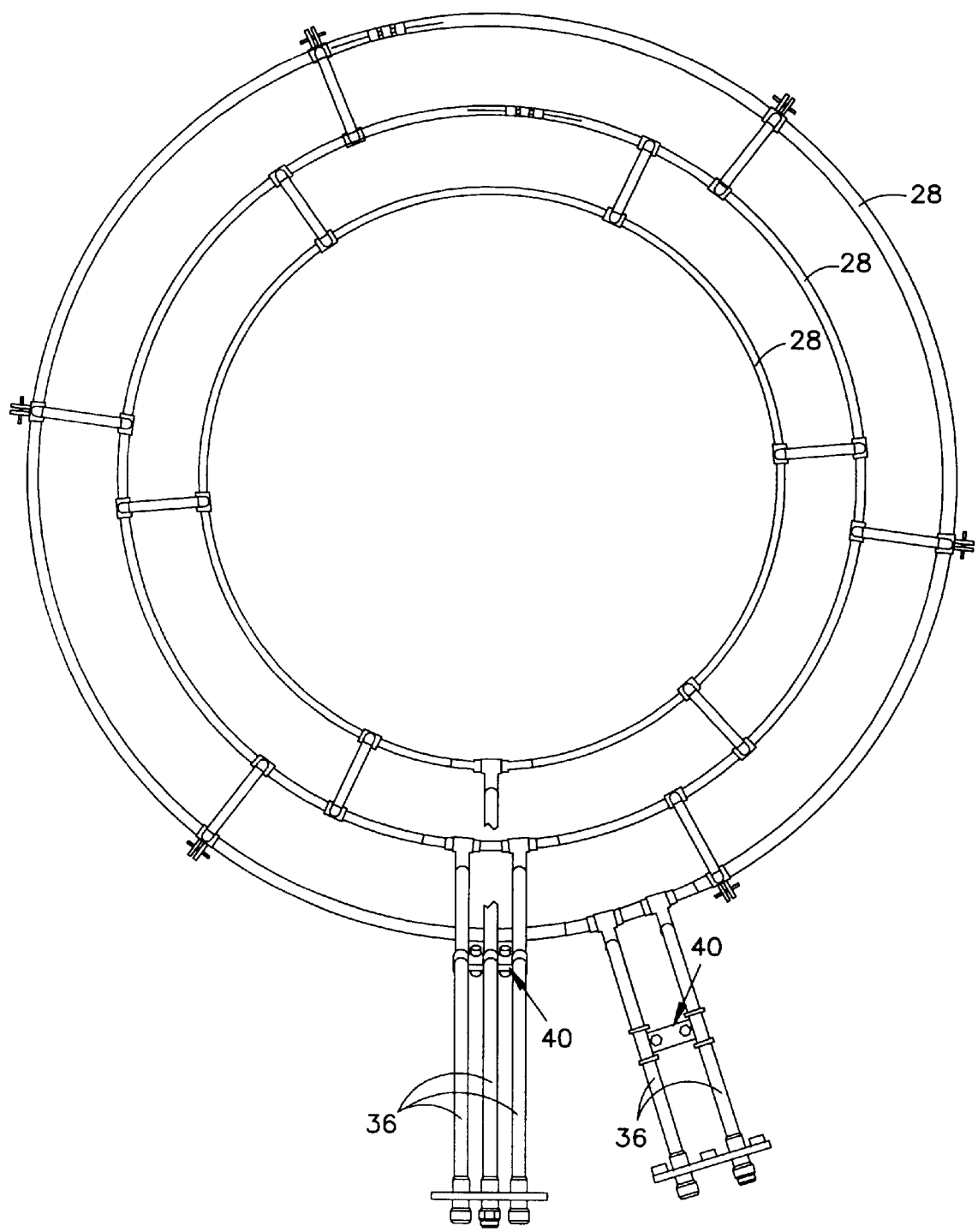
FIG. 3 is a diagrammatic view of a plurality of annular augmentor fuel manifolds, including the present invention wear resistant tube clamp.

Referring to FIG. 1, a gas turbine engine 10 includes a fan 12, a compressor 14, a combustor 16, a turbine 18, an augmentor 20, and a nozzle 22 symmetrically disposed relative to an axis of rotation 24. The fan 12 is forward of the nozzle 22 and the nozzle 22 is aft of the fan 12. The augmentor 20, as can be seen in FIGS. 2 and 3, includes a plurality of annular fuel manifolds 28, a bluff body assembly 30, and a plurality of ignitors 32, all in close proximity to, and aft of, the turbine 18. Each annular fuel manifold 28 includes a plurality of valves 34 and at least one feed tube 36 (FIG. 3). The manifold feed tubes 36 extend between the annular fuel manifold 28 and an augmentor fuel control (not shown). Sections of the feed tubes 36 are routed substantially parallel and in close proximity to one another. A wear resistant clamp 40 is provided in those sections to clamp the substantially parallel feed tubes 36.

Figure 4:
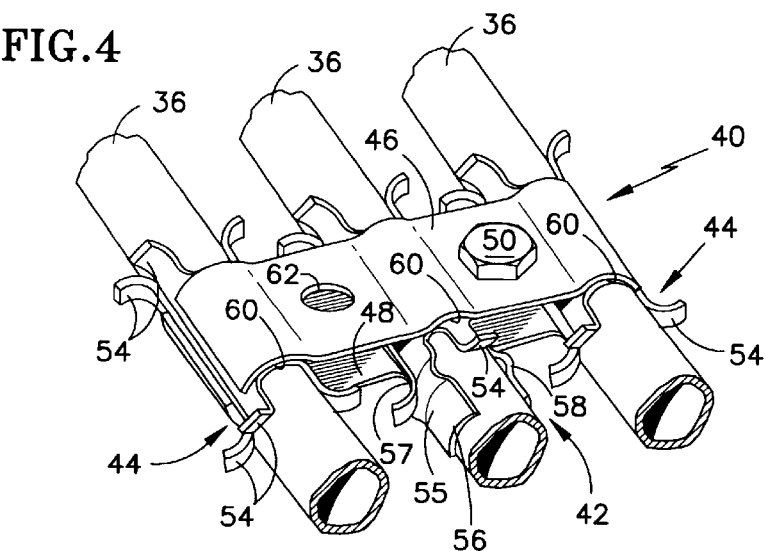
FIG. 4 is a diagrammatic perspective view of the present invention wear resistant tube clamp, shown in a three tube embodiment.
Figure 5:
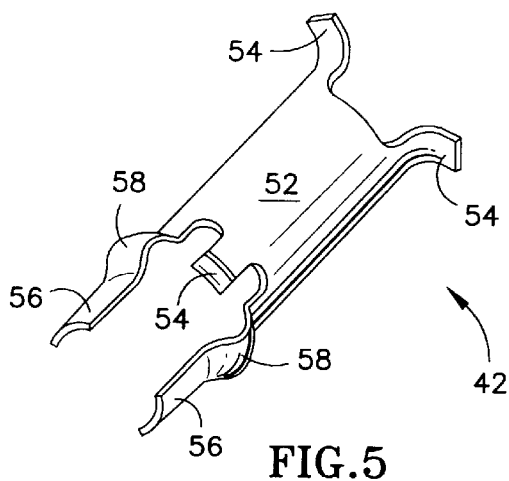
FIG. 5 is a diagrammatic perspective view of a wear sleeve embodiment.
Figure 6:
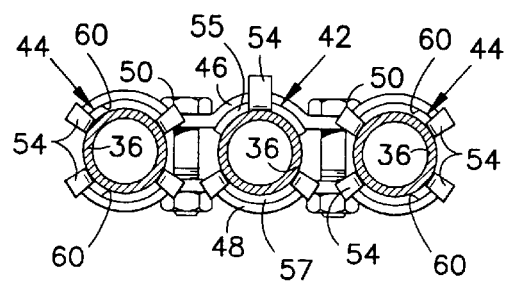
FIG. 6 is a diagrammatic end view of the present invention wear resistant tube clamp, shown in a three tube embodiment.

Referring to FIGS. 4–6, each wear resistant tube clamp 40 includes a first wear sleeve 42, a second wear sleeve 44, a first clamp member 46, a second clamp member 48, and a fastener 50. Each wear sleeve 42,44 includes a body 52 shaped to receive one of the feed tubes 36 (FIG. 5). The body 52 extends between a pair of outwardly extending retaining tabs 54. The wear sleeves 42,44 are formed from a material that is tolerant of the augmentor thermal environment, and one that has a hardness less than that of the tubes 36 and the clamp members 46,48. The "softer" wear sleeve material enables the wear sleeve 42,44 to act as a bearing between the tube 36 and the clamp members 46,48. In the preferred embodiment, the wear sleeves 42,44 are split into halves, each half having at least one retaining tab 54. The first wear sleeve 42 is fixed to one of the feed tubes 36, preferably by braze. The half 55 of the first wear sleeve 42 to be fixed to one of the tubes 36 includes a pair of braze tabs 56 to facilitate brazing. Each braze tab 56 preferably includes a jog 58 separating the braze tab 56 from the tube 36. The jog 58 facilitates the brazing process by preventing braze material from traveling to the body of the wear sleeve 42.

The first and second clamp members 46,48 include "n" number of formed channels 60 for receiving a wear sleeve 42,44 and tube 36, where "n" equals the number of tubes 36 to be clamped. The formed channels 60 are preferably separated from one another a distance adequate to avoid contact between adjacent tubes 36 during operation. Each clamp member 46,48 also includes an aperture 62 (FIG. 4) for receiving the fastener 50. The fastener 50 is a conventional nut and bolt, or self tapping screw, or the like.

Referring to FIGS. 4 and 6, the augmentor fuel manifolds 28 (see FIG. 3) are typically assembled as a unit which is subsequently installed into the engine and connected to the augmentor fuel control (not shown). During assembly of the augmentor manifolds 28 into a unit, the first half 55 of each first wear sleeve 42 is appropriately positioned and fixed to a feed tube 36. The other half 57 of the first wear sleeve 42 and the second wear sleeves 44 are subsequently installed between the tubes 36 and the clamp members 46,48. The retaining tabs 54 of the fixed first wear sleeve half 55 limit the travel of the clamp 40 relative to the tubes 36. The retaining tabs 54 of the other first wear sleeve half 57 and those of the second wear sleeve(s) 44 prevent the respective wear sleeves 57,44 from dislodging during use. The fastener 50 ties the clamp members 46,48 together with the tubes 36.

Although this invention has been shown and described with respect to the detailed embodiments thereof, it will be understood by those skilled in the art that various changes in form and detail thereof may be made without departing from the spirit and the scope of the invention.

I claim:

1. A gas turbine augmentor fuel manifold unit, comprising:
   a plurality of annular fuel manifolds, each having at least one feed tube, wherein some of said feed tubes are routed substantially parallel and in close proximity to one another;
   at least one wear resistant clamp for clamping said feed tubes, said clamp including:
      a first clamp member and a second clamp member, disposed on opposite sides of said feed tubes;
      a first wear sleeve and a second wear sleeve, each having a body shaped to receive one of said feed tubes, said body extending between at least a pair of retaining tabs, said wear sleeves disposed between said clamp members and said feed tubes;
      wherein said first wear sleeve is fixed to one of said feed tubes;
      a fastener, extending between said clamp members, said fastener holding said first and second clamp members in contact with said wear sleeves;
      wherein said retaining tabs of said fixed first wear sleeve limits the travel of said clamp members relative to said feed tubes, and said retaining tabs of said second wear sleeve prevent said second wear sleeve from becoming dislodged between said clamp members and said feed tube.

2. A gas turbine augmentor fuel manifold unit according to claim 1, wherein said first wear sleeve further comprises at least one attachment tab, wherein metallurgically bonding said tab to one of said feed tubes fixes said first wear sleeve to said feed tube.

3. A gas turbine augmentor fuel manifold unit according to claim 2, wherein said attachment tab further comprises a jog separating said attachment tab from said feed tube for a distance, wherein said jog substantially impedes migration of said metallurgical bond to said body of said first wear sleeve.

4. A multliple tube clamp, comprising:
   a first clamp member and a second clamp member, disposed on opposite sides of the tubes;
   a first wear sleeve and a second wear sleeve, each having a body shaped to receive one of the tubes, said body extending between at least a pair of retaining tabs, said wear sleeves disposed between said clamp members and the tubes;
   wherein said first wear sleeve is fixed to one of the tubes;
   a fastener, extending between said clamp members, said fastener holding said clamp members in contact with said wear sleeves;
   wherein said retaining tabs of said fixed first wear sleeve limits the travel of said clamp members relative to the tubes, and said retaining tabs of said second wear sleeve prevent said second wear sleeve from becoming dislodged between said clamp members and the tube.

5. A multiple tube clamp according to claim 4, wherein said first wear sleeve further comprises at least one attachment tab, wherein metallurgically bonding said tab to one of the tubes fixes said first wear sleeve to the tube.

6. A multiple tube clamp according to claim 5, wherein said attachment tab further comprises a jog separating said attachment tab from the tube for a distance, wherein said jog substantially impedes migration of said metallurgical bond to said body of said first wear sleeve.

* * * * *